No. 653,879.  
L. J. PHELPS.  
MOTOR VEHICLE.  
(Application filed May 19, 1900.)  
Patented July 17, 1900.

(No Model.)

Witnesses:  
Walter E. Lombard  
Ida M. Phelps

Inventor:  
Lucius J. Phelps

UNITED STATES PATENT OFFICE.

LUCIUS J. PHELPS, OF MELROSE, MASSACHUSETTS.

MOTOR-VEHICLE.

SPECIFICATION forming part of Letters Patent No. 653,879, dated July 17, 1900.

Application filed May 19, 1900. Serial No. 17,304. (No model.)

*To all whom it may concern:*

Be it known that I, LUCIUS J. PHELPS, a citizen of the United States, residing at Melrose Highlands, in the county of Middlesex and State of Massachusetts, have invented a new and useful Improvement in Motor-Vehicles, of which the following is a specification.

My invention relates to improvements in safety appliances for motor-vehicles; and the object of my improvement is to prevent the accidental starting or running away of the vehicle when the driver is not in his seat. I attain this object by the mechanism illustrated in the accompanying drawings, in which—

Figure 1:
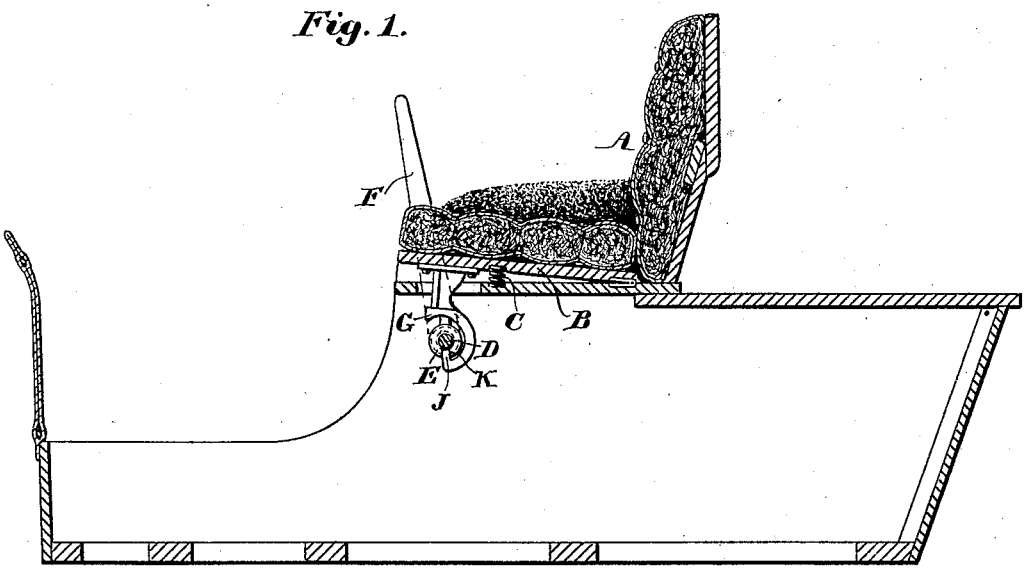
Figure 2:
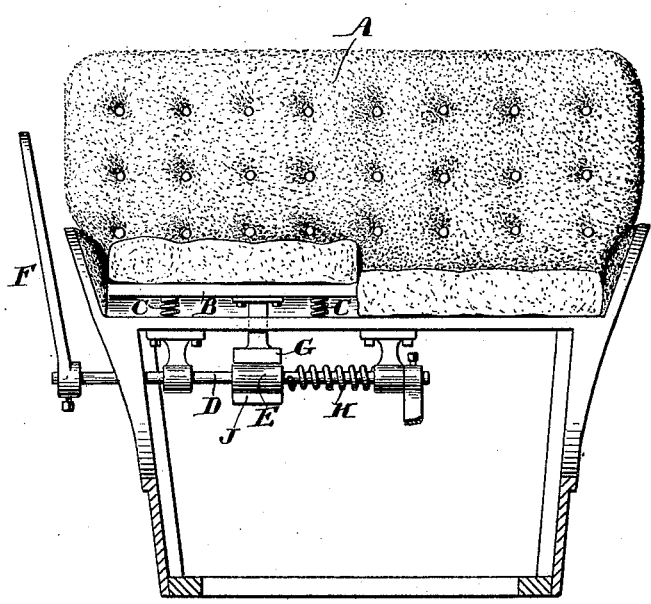
Figure 3:
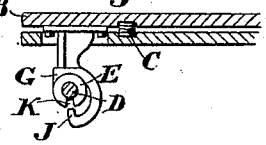

Figure 1 is a sectional view of a motor-vehicle body, showing my safety device in its normal locked condition when the driver is not on his seat. Fig. 2 shows a front view of the same parts, and Fig. 3 shows a side view of the device in the position it assumes when the driver is on his seat.

Similar letters refer to similar parts throughout the several views.

A is the carriage-seat.

B is a false bottom to the seat, which is normally held in a slightly-raised position by the springs C C.

F is the power-controlling lever, by means of which the driver applies, regulates, and shuts off the power.

D is a shaft passing underneath the seat, to which the lever F is attached and which rocks to and fro as the lever F is moved in applying, regulating, and shutting off the power.

E is a drum secured to the shaft D, having a groove K in its bottom side.

H is a torsion-spring coiled about the shaft D, to which it is secured by one end, while the other end is secured to the boxing supporting the shaft. In this position the spring is adjusted to normally throw off the power.

G is a brake-shoe secured to the false seat-bottom B and adapted to rest upon the drum E when the false seat-bottom is depressed. The shoe G also carries the hook J in a position to enter the groove K when the false seat-bottom is raised by the springs C C.

The action of the device is as follows: As viewed in Figs. 1 and 2, the driver not being in his seat the springs C C raise the false bottom B, forcing the hook J into the groove K in the drum E, securely locking the shaft D in the position which shuts off the power, so that a careless, inexperienced, or mischievous person cannot apply the power and start the vehicle by pulling or accidentally leaning against the lever F. When the driver takes his seat, the false bottom B is depressed by his weight, the hook J is drawn out of the groove K, and the shoe G rests upon the drum H, as shown in Fig. 3. The shoe-brake offers sufficient resistance to the movement of the shaft D to prevent its being moved by the spring H; but by means of the lever F the driver rocks the shaft, controlling the power at will, and the lever F will remain in any desired position without effort on the part of the driver so long as he remains on his seat; but should he be thrown from his seat by a shock or accident the spring H would instantly throw off the power and the springs C C would force the hook J into its groove K, thus locking the parts and preventing any further application of power to the vehicle.

Having thus described my invention, what I claim, and desire to secure by Letters Patent, is—

1. In a motor-vehicle a spring attached to the power-controlling lever adapted to throw off the power, and a brake operated by the weight of the driver to hold said lever at rest in any position when the driver is on his seat substantially as described.

2. In a motor-vehicle a spring on the power-controlling lever adapted to throw off the power, a positive lock on said lever which normally locks it in the off position, adapted to be unlocked by the weight of the driver when he takes his seat, and a friction-brake on said lever, set by the weight of the driver sufficiently strong to hold the power-controlling lever at rest in any position without effort on the part of the driver but yielding readily to pressure applied to the lever, substantially as described.

In testimony that I claim the foregoing as my invention I have signed my name, in presence of two witnesses, this 9th day of May, 1900.

LUCIUS J. PHELPS.

Witnesses:
IDA M. PHELPS,
E. B. PHELPS.